US012604353B2

(12) United States Patent (10) Patent No.: US 12,604,353 B2
Shinozaki et al. (45) Date of Patent: Apr. 14, 2026

(54) COMMUNICATION SYSTEM AND COMMUNICATION CONTROL METHOD TO AVOID UNINTENDED CONTROL ON MULTIPLE COMMUNICATION DEVICES

(71) Applicant: SONY SEMICONDUCTOR SOLUTIONS CORPORATION, Kanagawa (JP)

(72) Inventors: Katsuya Shinozaki, Kanagawa (JP); Atsushi Mori, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 368 days.

(21) Appl. No.: 18/250,929

(22) PCT Filed: Oct. 12, 2021

(86) PCT No.: PCT/JP2021/037794
§ 371 (c)(1),
(2) Date: Apr. 27, 2023

(87) PCT Pub. No.: WO2022/097433
PCT Pub. Date: May 12, 2022

(65) Prior Publication Data
US 2023/0397277 A1 Dec. 7, 2023

(30) Foreign Application Priority Data
Nov. 5, 2020 (JP) ................................. 2020-185337

(51) Int. Cl.
H04W 76/15 (2018.01)
H04W 8/22 (2009.01)

(52) U.S. Cl.
CPC ............. H04W 76/15 (2018.02); H04W 8/22 (2013.01)

(58) Field of Classification Search
CPC ......... H04W 76/15; H04W 8/22; H04W 4/00; H04W 84/10; H04W 72/51; H04L 69/14; H04L 12/14; H04M 1/2745
See application file for complete search history.

(56) References Cited

U.S. PATENT DOCUMENTS

| | | | | |
|---|---|---|---|---|
| 2004/0151475 A1* | 8/2004 | Taira | .................... | G11B 27/034 |
| | | | | 386/E5.064 |
| 2004/0163116 A1* | 8/2004 | Taira | ..................... | G11B 27/34 |
| | | | | 725/89 |

(Continued)

FOREIGN PATENT DOCUMENTS

| | | | |
|---|---|---|---|
| JP | 2013-171518 A | | 9/2013 |
| JP | 2013171518 | * | 9/2013 |

(Continued)

OTHER PUBLICATIONS

International Search Report and Written Opinion of PCT Application No. PCT/JP2021/037794, issued on Jan. 11, 2022, 09 pages of ISRWO.

*Primary Examiner* — Mewale A Ambaye
(74) *Attorney, Agent, or Firm* — CHIP LAW GROUP

(57) ABSTRACT

In a communication system according to the present disclosure, multiple communication devices each include a reception unit configured to receive data including a control command and device information from multiple external devices, a storage unit that stores the device information regarding a first external device that has obtained a control right for the grouping, and a control unit that determines whether or not to execute the control command included in the data received by the reception unit after the control right for the grouping is obtained by the first external device, on the basis of presence or absence of a cancellation command that cancels the grouping, and the device information stored in the storage unit.

8 Claims, 8 Drawing Sheets

(56)            References Cited

U.S. PATENT DOCUMENTS

2019/0082065 A1 *   3/2019  Tokuchi ................ G06F 3/1275
2024/0147328 A1 *   5/2024  Kim ..................... H04W 36/30
2024/0340069 A1 *  10/2024  Shen ................... H04B 7/0456

FOREIGN PATENT DOCUMENTS

JP          2017-525278 A      8/2017
JP          2019-016860 A      1/2019
JP          2019-050520 A      3/2019
JP          2019-110470 A      7/2019

* cited by examiner

[FIG. 1]
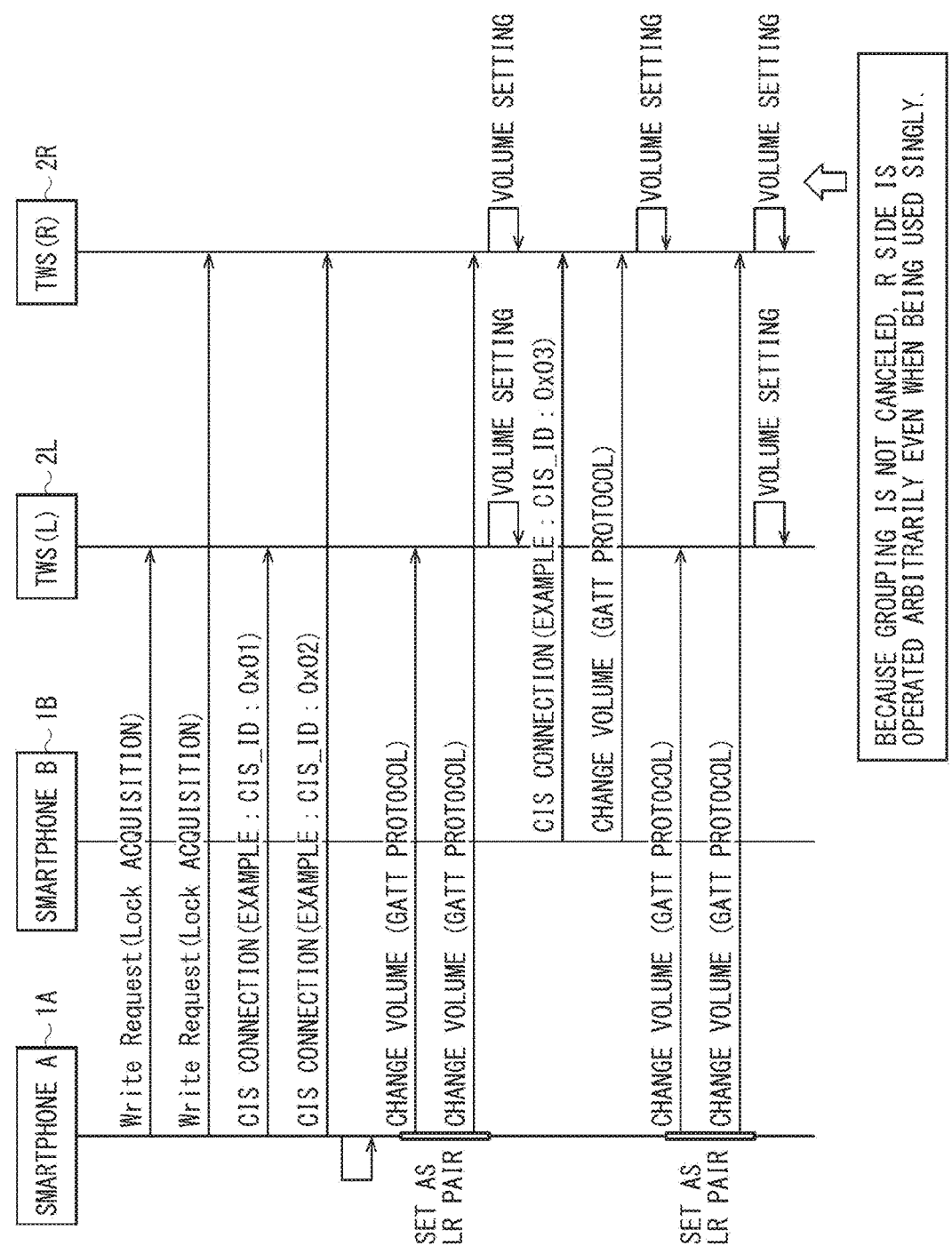

[FIG. 2]
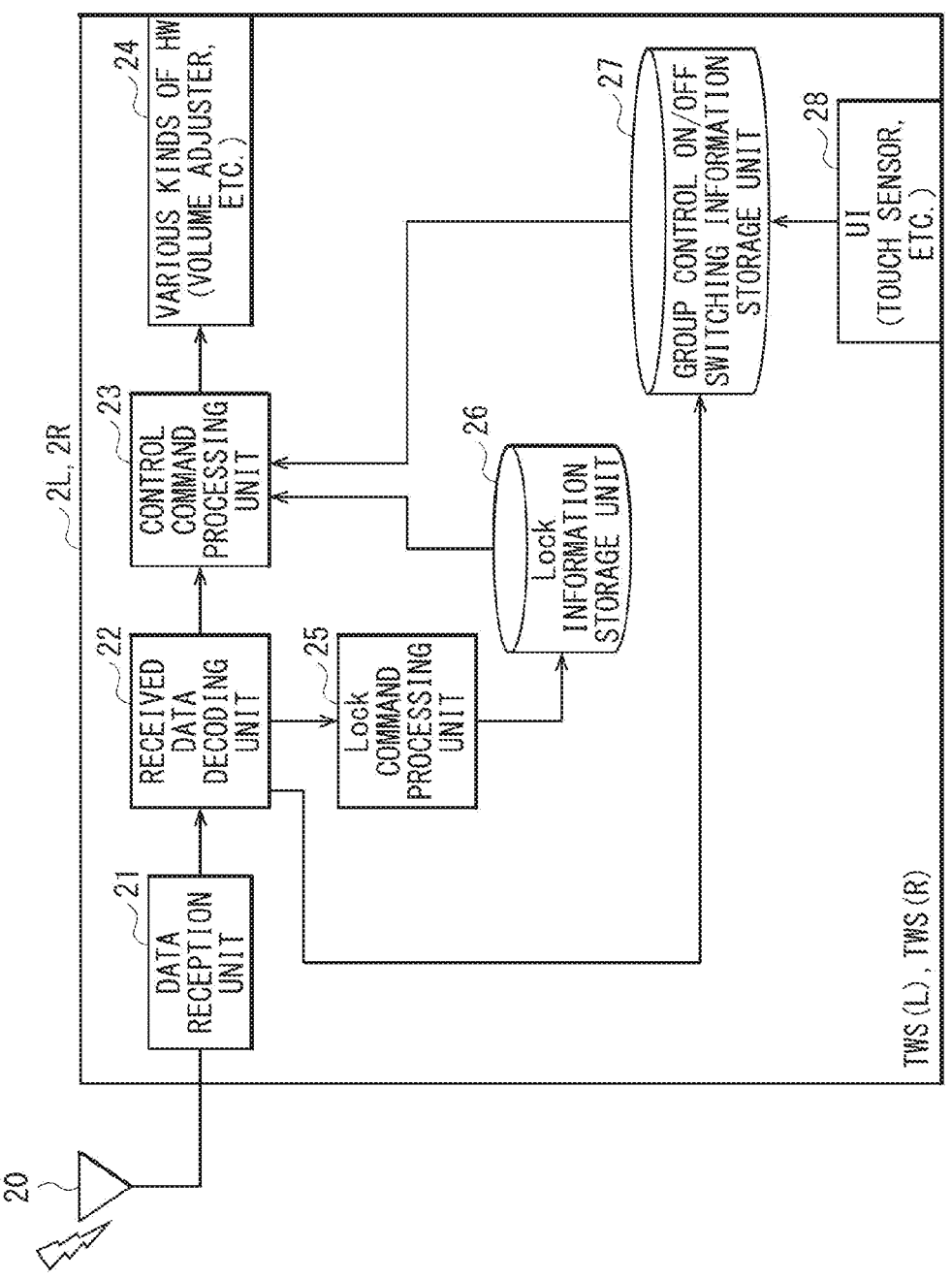

[FIG. 3]
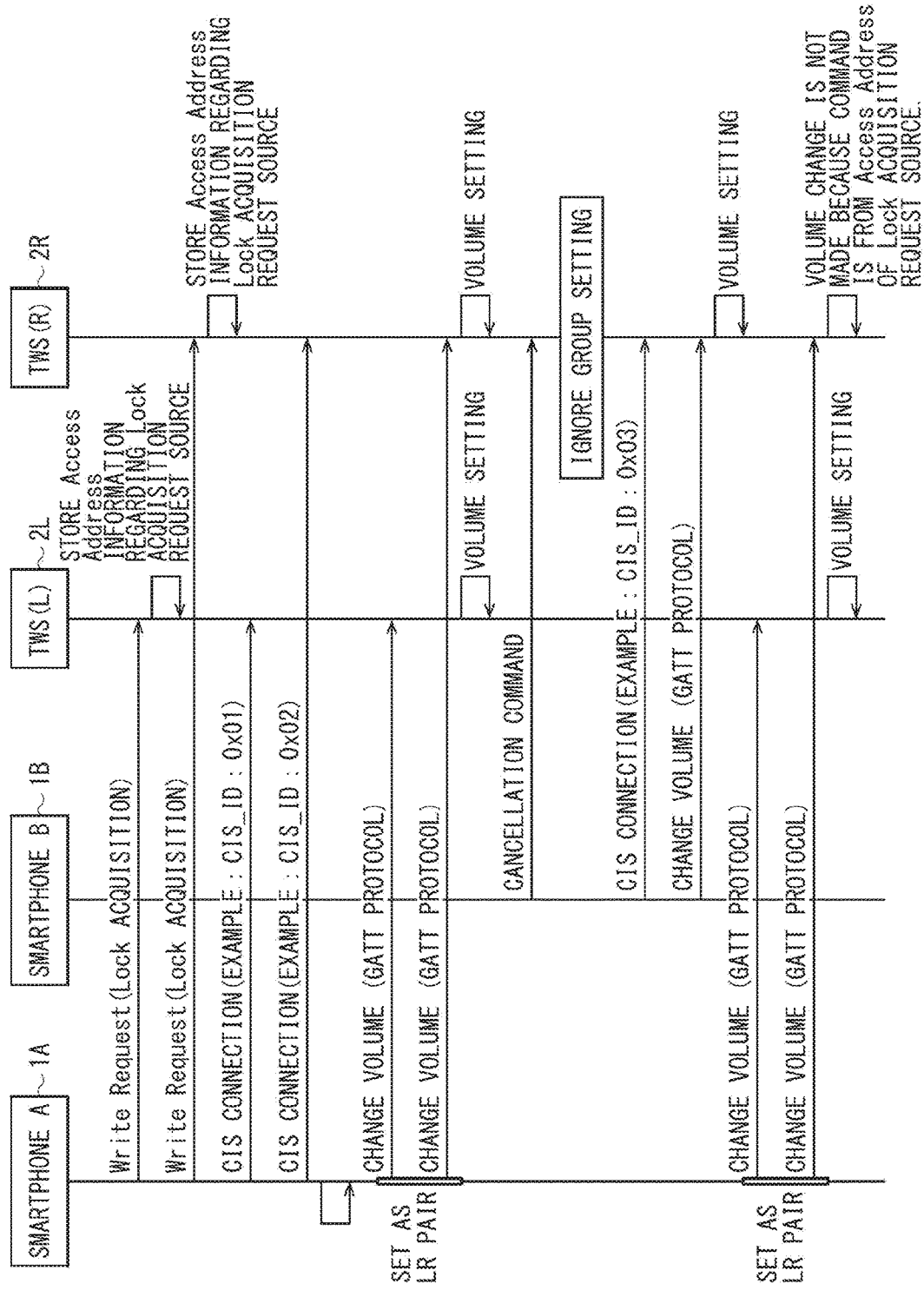

[FIG. 4]
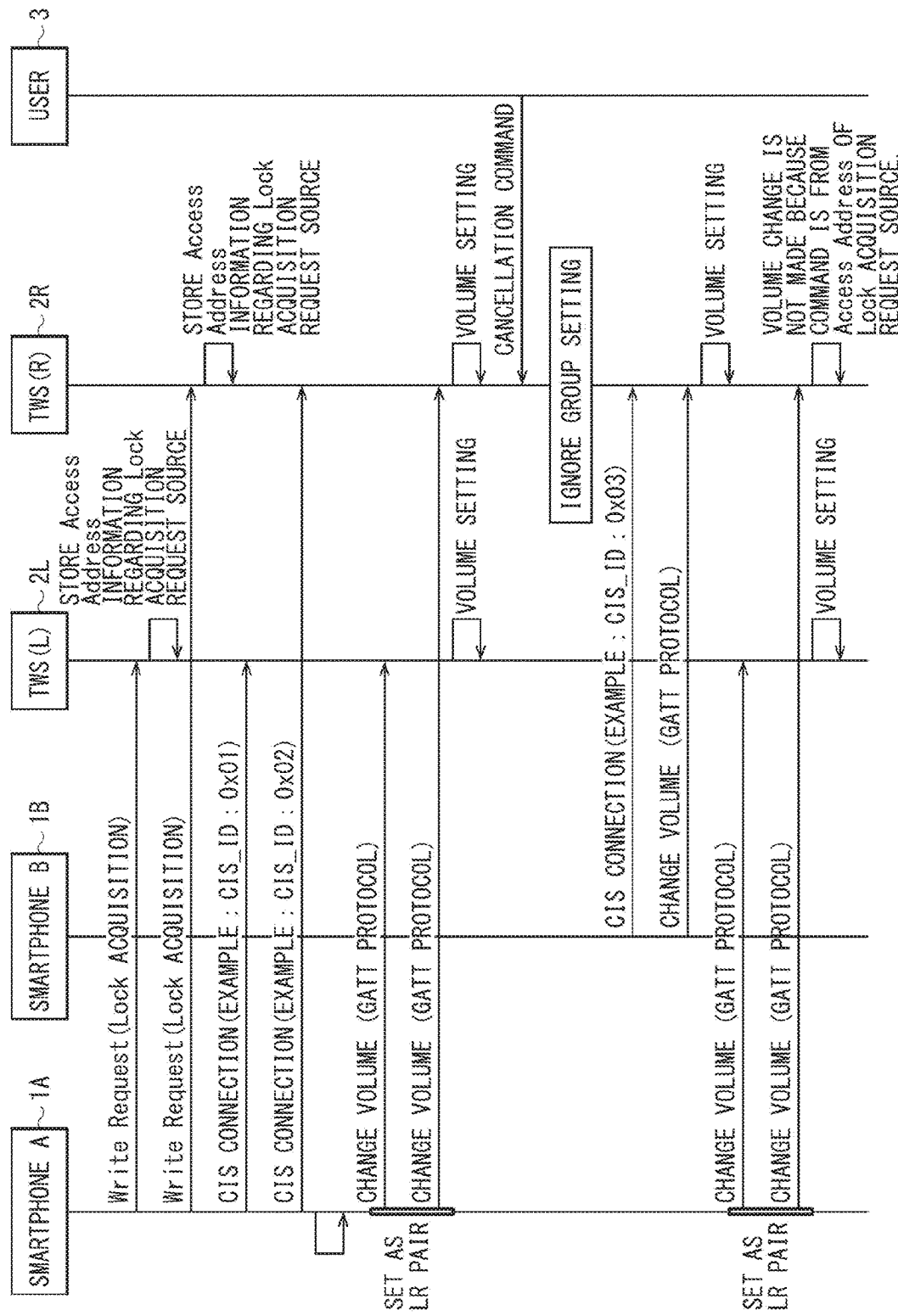

[FIG. 5]
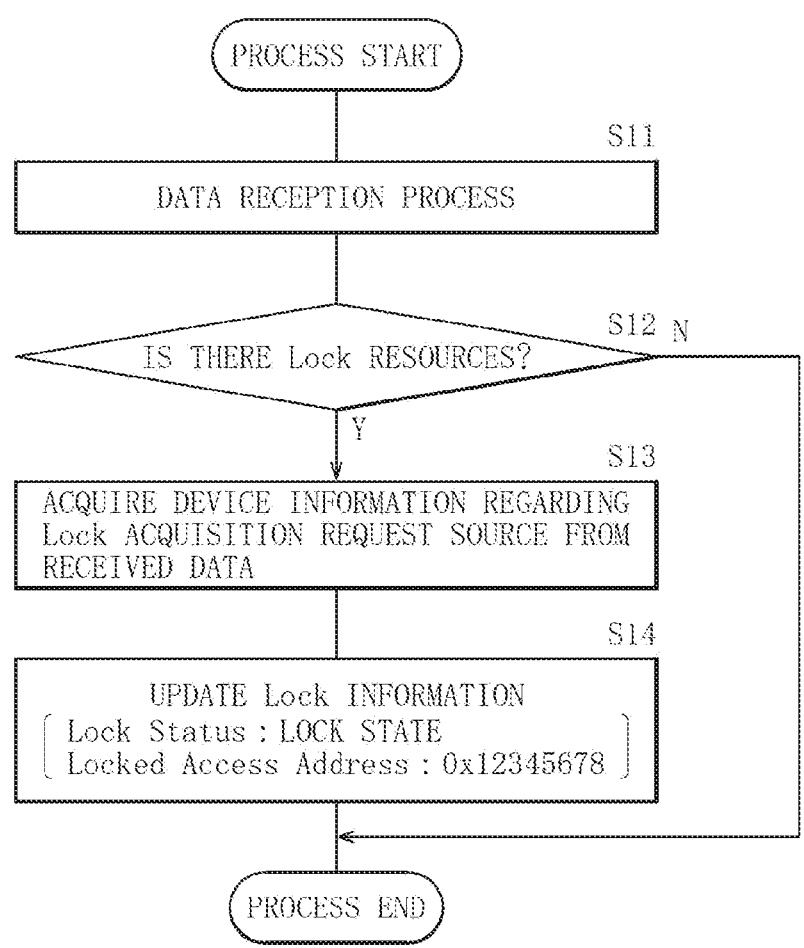

[FIG. 6]
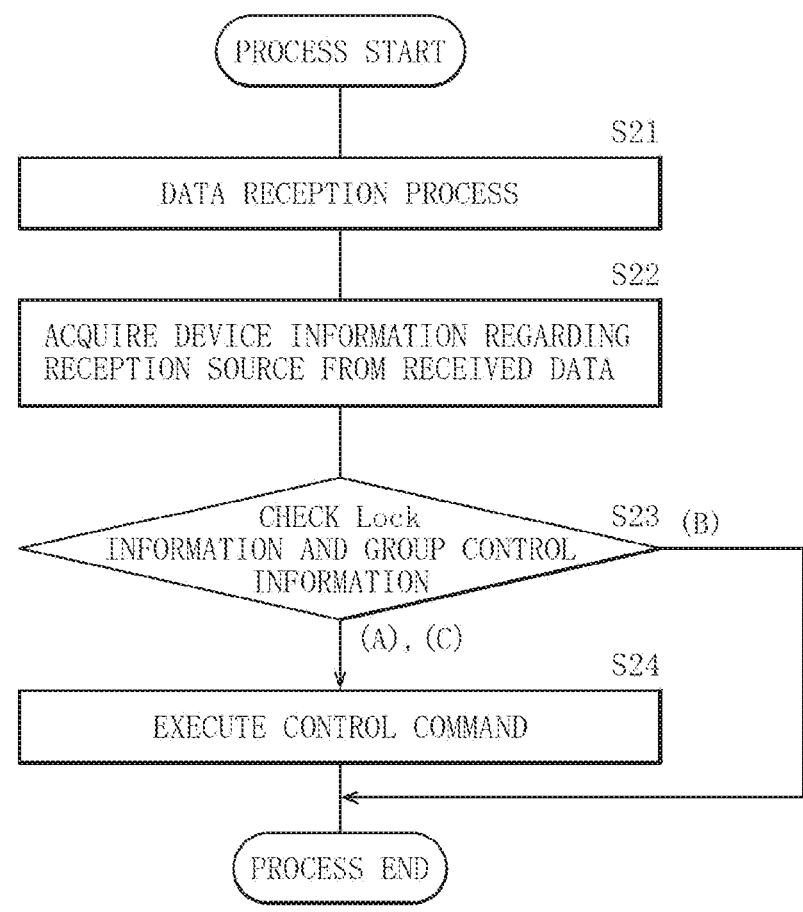

[FIG. 7]

| S23 | DETAILS OF CONDITION |
|---|---|
| (A) | DEVICE INFORMATION OF RECEIVED DATA = DEVICE INFORMATION OF Lock INFORMATION<br>Lock Status = Lock<br>GROUP CONTROL INFORMATION = VALID<br>(CANCELLATION COMMAND ABSENT) |
| (B) | DEVICE INFORMATION OF RECEIVED DATA = DEVICE INFORMATION OF Lock INFORMATION<br>Lock Status = Lock<br>GROUP CONTROL INFORMATION = INVALID<br>(CANCELLATION COMMAND PRESENT) |
| (C) | DEVICE INFORMATION OF RECEIVED DATA ≠ DEVICE INFORMATION OF Lock INFORMATION<br>Lock Status = Lock<br>GROUP CONTROL INFORMATION = INVALID<br>(CANCELLATION COMMAND PRESENT) |

[FIG. 8]
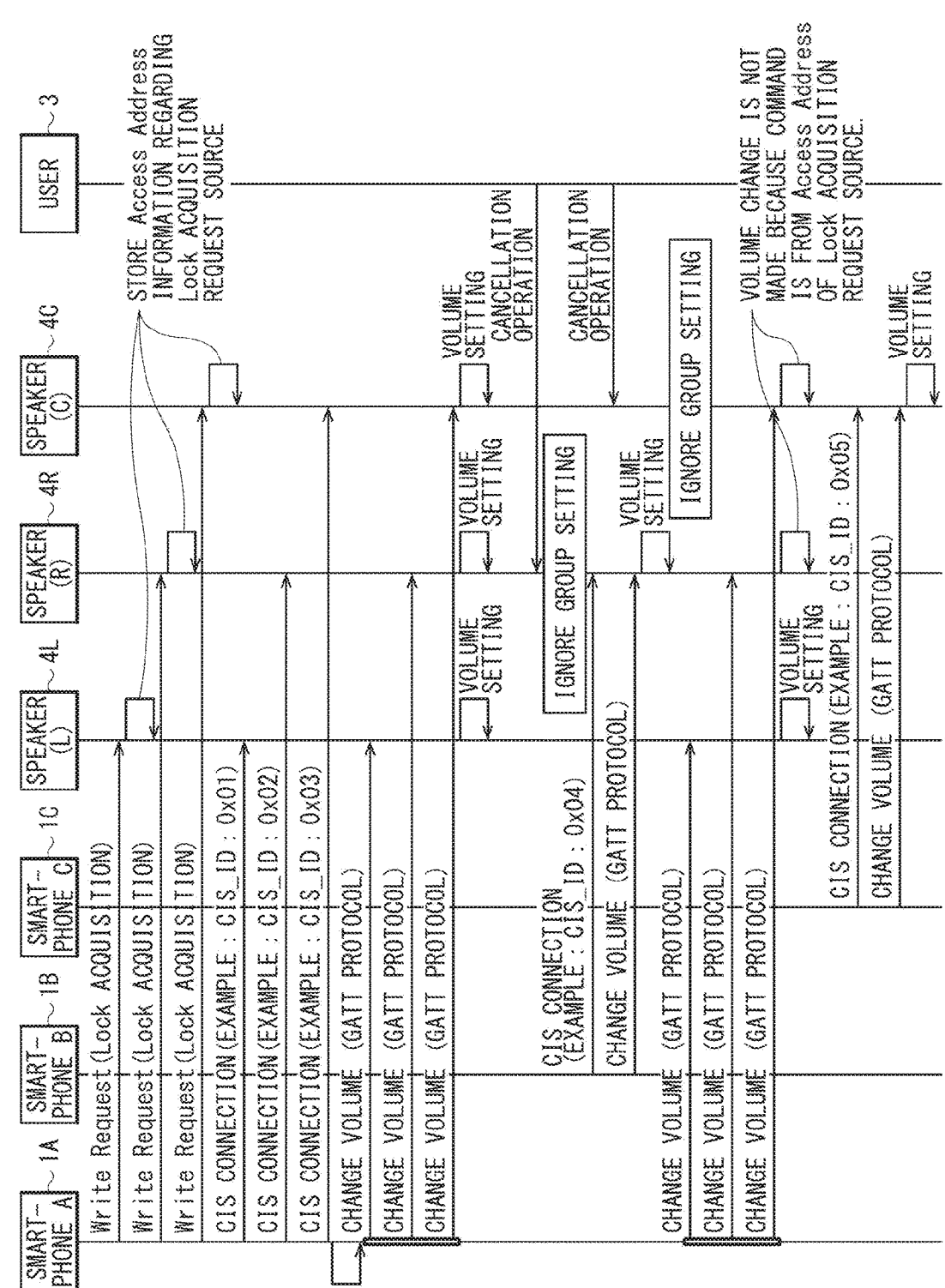

1

COMMUNICATION SYSTEM AND COMMUNICATION CONTROL METHOD TO AVOID UNINTENDED CONTROL ON MULTIPLE COMMUNICATION DEVICES

CROSS REFERENCE TO RELATED APPLICATIONS

This application is a U.S. National Phase of International Patent Application No. PCT/JP2021/037794 filed on Oct. 12, 2021, which claims priority benefit of Japanese Patent Application No. JP 2020-185337 filed in the Japan Patent Office on Nov. 5, 2020. Each of the above-referenced applications is hereby incorporated herein by reference in its entirety.

TECHNICAL FIELD

The present disclosure relates to a communication system and a communication control method that use multiple communication devices.

BACKGROUND ART

Bluetooth (registered trademark) is one of wireless communication techniques. In particular, BLE (Bluetooth Low Energy) is a standard that achieves lower power consumption (for example, see PTLs 1 to 3). Further, BLE Audio has been developed as a standard that allows multiple communication devices such as true wireless stereo (TWS: True Wireless Stereo) devices to be controlled at the same time as a pair (a group). In the BLE Audio, it is possible to group and control multiple communication devices, but it is also possible to individually control each of the multiple communication devices without grouping them.

CITATION LIST

Patent Literature

PTL 1: Japanese Unexamined Patent Application Publication No. 2019-110470
PTL 2: Japanese Unexamined Patent Application Publication No. 2019-16860
PTL 3: Japanese Unexamined Patent Application Publication (Published Japanese Translation of PCT Application) No. 2017-525278

SUMMARY OF THE INVENTION

In a case where multiple communication devices are allowed to be controlled in a grouped state and also to be controlled individually, control unintended by a user can be performed.

It is desirable to provide a communication system and a communication control method that make it possible to avoid unintended control on multiple communication devices.

A communication system according to an embodiment of the present disclosure includes multiple communication devices that are able to be controlled in a state of being grouped with each other, by any first external device out of multiple external devices, and are able to be controlled in a state of being independent of each other, by any at least one second external device out of the multiple external devices. The multiple communication devices each include a reception unit configured to receive data including a control command and device information from the multiple external devices, a storage unit that stores the device information regarding the first external device that has obtained a control right for the grouping, and a control unit that determines whether or not to execute the control command included in the data received by the reception unit after the control right for the grouping is obtained by the first external device, on the basis of presence or absence of a cancellation command that cancels the grouping, and the device information stored in the storage unit.

A communication control method according to an embodiment of the present disclosure is a communication control method in a communication system including multiple communication devices that are able to be controlled in a state of being grouped with each other, by any first external device out of multiple external devices, and are able to be controlled in a state of being independent of each other, by any at least one second external device out of the multiple external devices. The communication control method includes, by each of the multiple communication devices: receiving data including a control command and device information from the multiple external devices; storing, in a storage unit, the device information regarding the first external device that has obtained a control right for the grouping; and determining whether or not to execute the control command included in the data received after the control right for the grouping is obtained by the first external device, on the basis of presence or absence of a cancellation command that cancels the grouping, and the device information stored in the storage unit.

In the communication system or the communication control method according to the embodiment of the present disclosure, whether or not to execute the control command included in the data received after the control right for the grouping is obtained by the first external device is determined, on the basis of the presence or absence of the cancellation command that cancels the grouping, and the device information stored in the storage unit.

BRIEF DESCRIPTION OF THE DRAWINGS

FIG. 1 is a sequence diagram illustrating an overview of operation of a communication system according to a comparative example.
FIG. 2 is a block diagram schematically illustrating a configuration example of a communication device in a communication system according to a first embodiment of the present disclosure.
FIG. 3 is a sequence diagram illustrating a first example of operation of the communication system according to the first embodiment.
FIG. 4 is a sequence diagram illustrating a second example of the operation of the communication system according to the first embodiment.
FIG. 5 is a flowchart illustrating an example of a process that is performed when a control command for Lock acquisition is received in each of multiple communication devices of the communication system according to the first embodiment.
FIG. 6 is a flowchart illustrating an example of a process that is performed when a control command such as a setting change is received in each of the multiple communication devices of the communication system according to the first embodiment.
FIG. 7 is an explanatory diagram illustrating an example of branch conditions in step S23 in the flowchart illustrated in FIG. 6.

FIG. 8 is a sequence diagram illustrating an example of operation of a communication system according to a modification example of the first embodiment.

MODES FOR CARRYING OUT THE INVENTION

In the following, description is given of embodiments of the present disclosure in detail with reference to the drawings. It is to be noted that the description is given in the following order.

0. Comparative Example (FIG. 1)
1. First Embodiment (FIGS. 2 to 8)
   1.1 Configuration
   1.2 Operation
   1.3 Effects
   1.4 Modification Example
2. Other Embodiments

0. Comparative Example (Overview of Communication System According to Comparative Example)

FIG. 1 illustrates an overview of operation (sequence) of a communication system according to a comparative example.

The communication system according to the comparative example includes multiple communication devices 2L and 2R. The multiple communication devices 2L and 2R are each able to be controlled by multiple external devices 1A and 1B.

The multiple external devices 1A and 1B may each be, for example, a mobile terminal such as a smartphone. FIG. 1 illustrates an example in which the external device 1A is a smartphone A, and the external device 1B is a smartphone B. The multiple communication devices 2L and 2R may be, for example, TWS devices such as TWS earphones. FIG. 1 illustrates an example in which the communication device 2L is, for example, a left earphone (denoted by a TWS(L)) of the TWS earphones, and the communication device 2R is, for example, a right earphone (denoted by a TWS(R)) of the TWS earphones.

Here, a case where the communication system according to the comparative example performs communication based on a BLE Audio standard is described as an example. In BLE Audio, for example, a system that makes it possible to control multiple BLE devices such as TWS devices at the same time is defined by CSIP (Coordinated Set Identification Profile). Specifically, one external device acquires a lock (Lock) (obtains a control right) for the multiple BLE devices on the basis of the CSIP, and sets a group (CIG: Connected Isochronous Group). Transmitting a control command to a CIS (Connected Isochronous Stream) included in the group makes it is possible to perform setting corresponding to the control command on the multiple BLE devices.

For example, in the example of FIG. 1, the multiple communication devices 2L and 2R (the TWS(L) and the TWS(R)) are able to be controlled in a state of being grouped with each other, by any one of the multiple external devices 1A and 1B (the smartphones A and B). In addition, the multiple communication devices 2L and 2R (the TWS(L) and the TWS(R)) are able to be controlled in a state of being independent of each other, by at least one of the multiple external devices 1A and 1B (the smartphones A and B).

For example, in a state in which BLE connection is established between the smartphone A and the TWS(L) and between the smartphone A and the TWS(R), a Write Request for Lock acquisition is transmitted from the smartphone A to the TWS(L) and the TWS(R), and the smartphone A acquires a Lock (obtains a control right). Thus, the TWS(L) and the TWS(R) are grouped, making it possible for the smartphone A to control the TWS(L) and the TWS(R) at the same time. Next, the smartphone A establishes CIS connection to the TWS(L) and the TWS(R). At this time, CIS_IDs are set (e.g., CIS_ID: 0x01, CIS_ID: 0x02).

Next, the smartphone A transmits a control command that changes, for example, volume setting to the TWS(L) and the TWS(R). Thus, the TWS(L) and the TWS(R) are subjected to volume setting control by the smartphone A as a LR pair. The control command is transmitted on the basis of a GATT (Generic Attribute Profile) protocol.

(Issue)

After grouping is performed by the smartphone A as described above, the TWS(L) and the TWS(R) may each be desired to be used singly by the smartphones A and B. For example, it may be desired that the TWS(L) be singly used by the smartphone A, and the TWS(R) be singly used by the smartphone B. In this case, one end, unless the smartphone A cancels grouping, unintended control can be performed. For example, as illustrated in the example of FIG. 1, after grouping is performed by the smartphone A, the smartphone B establishes CIS connection (e.g., CIS_ID: 0x03) to the TWS(R), and the smartphone B transmits a control command to the TWS(R), which makes it possible for the smartphone B to control the volume setting of the TWS(R). Thereafter, if the smartphone A further transmits a control command to the TWS(L), the control command is transmitted also to the TWS(R), because the TWS(L) and the TWS(R) are in a grouped state. In this case, although the smartphone B side intends to use the TWS(R) singly, a setting operation is arbitrarily performed by the smartphone A side, and a volume different from a volume to be originally set by the smartphone B side can be set.

1. First Embodiment

[1.1 Configuration]

A communication system according to a first embodiment of the present disclosure includes the multiple communication devices 2L and 2R, as illustrated in FIGS. 3 and 4 to be described later, as with the communication system according to the comparative example (FIG. 1). The multiple communication devices 2L and 2R are each able to be controlled by the multiple external devices 1A and 1B. In the following, a case where communication based on the BLE Audio standard is performed is described as an example, as with the communication system according to the comparative example. Description is omitted as appropriate regarding portions having configurations and operations similar to those of the communication system according to the comparative example.

FIG. 2 schematically illustrates a configuration example of each of the multiple communication devices 2L and 2R (the TWS(L) and the TWS(R)) in the communication system according to the first embodiment of the present disclosure.

The multiple communication devices 2L and 2R each include an antenna 20, a data reception unit 21, a received data decoding unit 22, a control command processing unit 23, various kinds of HW (hardware) 24, a Lock command processing unit 25, a Lock information storage unit 26, a group control on/off switching information storage unit 27, and a UI (user interface) 28.

The antenna 20 transmits and receives data by wireless communication to and from each of the multiple external devices 1A and 1B.

The data reception unit 21 receives the data from each of the multiple external devices 1A and 1B, via the antenna 20. The data from each of the multiple external devices 1A and 1B includes a control command and device information. The device information may be, for example, an Access Address of each of the multiple external devices 1A and 1B that have transmitted the data.

Here, the data reception unit 21 corresponds to a specific example of a "reception unit" in the present disclosure.

The received data decoding unit 22 analyzes the data received by the data reception unit 21, and outputs the received data to the control command processing unit 23 or the Lock command processing unit 25 depending on contents of the control command included in the received data. In addition, in a case where the received data includes a cancellation command for cancellation of grouping, the received data decoding unit 22 rewrites group control information of the group control on/off switching information storage unit 27.

The Lock information storage unit 26 stores Lock information. The Lock information stored in the Lock information storage unit 26 includes, for example, a Lock Status and a Locked Access Address. The Locked Access Address is device information regarding the external device as a Lock acquisition request source that has obtained a control right for grouping (a Lock). The Lock Status indicates information regarding on/off of a Lock state (whether or not the communication device is locked).

Here, the Lock information storage unit 26 corresponds to a specific example of a "storage unit" in the present disclosure.

In a case where the control command included in the received data is a Lock control command, the Lock command processing unit 25 acquires device information regarding a reception source from the received data, and writes the Locked Access Address, which is the device information, and the Lock Status, which is the information regarding the Lock state, as the Lock information, into the Lock information storage unit 26.

The group control on/off switching information storage unit 27 holds the group control information. The group control information is information indicating whether or not the locked communication device is to be controlled as paired devices (grouped devices), and includes information indicating whether group control is valid or invalid. In a case where there is a cancellation command for cancellation of grouping, information indicating that grouping is invalid is stored in the group control on/off switching information storage unit 27 by the UI 28 or the received data decoding unit 22.

The UI 28 is a UI such as a touch sensor or an operation button that accepts an operation performed by a user 3. For example, the UI 28 accepts input of a cancellation command for cancellation of grouping, and rewrites the group control information of the group control on/off switching information storage unit 27. The cancellation command is inputted by, for example, holding down a specific part of the operation button or the touch sensor in the UI 28.

Here, the UI 28 corresponds to a specific example of an "operation unit" in the present disclosure.

The control command processing unit 23 refers to the group control information stored in the group control on/off switching information storage unit 27 and the Lock information stored in the Lock information storage unit 26, and determines whether or not to execute a process for a control command.

For example, in state in which a Lock has been obtained, in a case where the group control indicated by the group control information is valid, the control command processing unit 23 executes a process for a control command from a first external device that has obtained the Lock (e.g., the smartphone A). In addition, for example, even in the state in which a Lock has been obtained, in a case where the group control indicated by the group control information is invalid, the control command processing unit 23 does not execute a process for a control command from the first external device that has obtained the Lock.

Here, the control command processing unit 23 corresponds to a specific example of a "control unit" in the present disclosure.

For example, the control command processing unit 23 determines whether or not to execute the control command included in the data received by the data reception unit 21 after the control right for grouping (the Lock) is obtained by the first external device, on the basis of presence or absence of a cancellation command that cancels grouping, and the device information stored in the Lock information storage unit 26. The presence or absence of a cancellation command is determined on the basis of the group control information stored in the group control on/off switching information storage unit 27.

For example, the control command processing unit 23 determines whether or not the data received by the data reception unit 21 is data transmitted from the first external device that has obtained the Lock, on the basis of the device information stored in the Lock information storage unit 26 and the device information included in the data received by the data reception unit 21.

In a case where, for example, the control command processing unit 23 determines that a cancellation command is present, and that the data received by the data reception unit 21 is data transmitted from the first external device that has obtained the Lock (a condition (B) illustrated in step S23 of FIG. 6 to be described later and in FIG. 7), the control command processing unit 23 does not execute the control command included in the data received by the data reception unit 21.

In a case where, for example, the control command processing unit 23 determines that a cancellation command is present, and that the data received by the data reception unit 21 is not data transmitted from the first external device that has obtained the Lock (a condition (C) illustrated in step S23 of FIG. 6 to be described later and in FIG. 7), the control command processing unit 23 executes the control command included in the data received by the data reception unit 21.

In a case where, for example, the control command processing unit 23 determines that a cancellation command is absent, and that the data received by the data reception unit 21 is data transmitted from the first external device that has obtained the Lock (a condition (A) illustrated in step S23 of FIG. 6 to be described later and in FIG. 7), the control command processing unit 23 executes the control command included in the data received by the data reception unit 21.

The various kinds of HW 24 is HW to be controlled by the control command processing unit 23, and includes, for example, a volume adjuster.

[1.2 Operation]

FIG. 3 illustrates a first example of operation (sequence) of the communication system according to the first embodiment. FIG. 4 illustrates a second example of the operation (sequence) of the communication system according to the first embodiment.

FIGS. 3 and 4 illustrate an example in which the external device 1A (the smartphone A) out of the multiple external devices 1A and 1B obtains a Lock as the first external device, and the external device 1B (the smartphone B) controls the communication device 2R (the TWS(R)) singly as a second external device. In addition, FIG. 3 illustrates an example in which a cancellation command that cancels grouping is transmitted from the smartphone B to the TWS(R). FIG. 4 illustrates an example in which the UI 28 of the TWS(R) accepts a cancellation operation performed by the user 3.

For example, in a state in which BLE connection is established between the smartphone A and the TWS(L) and between the smartphone A and the TWS(R), a Write Request for Lock acquisition is transmitted from the smartphone A to the TWS(L) and the TWS(R), and the smartphone A acquires a Lock (obtains a control right). Thus, the TWS(L) and the TWS(R) are grouped, making it possible for the smartphone A to control the TWS(L) and the TWS(R) at the same time. At this time, the TWS(L) and the TWS(R) each store the device information regarding the smartphone A serving as the Lock acquisition request source, as the Locked Access Address, in the Lock information storage unit 26.

Next, the smartphone A establishes CIS connection to the TWS(L) and the TWS(R). At this time, CIS_IDs are set (e.g., CIS_ID: 0x01, CIS_ID: 0x02).

Next, the smartphone A transmits a control command that changes, for example, volume setting to the TWS(L) and the TWS(R). Thus, the TWS(L) and the TWS(R) are subjected to volume setting control by the smartphone A as a LR pair. The control command is transmitted on the basis of the GATT protocol.

After grouping is performed by the smartphone A, a cancellation command that cancels grouping is transmitted from the smartphone B to the TWS(R) (FIG. 3). Alternatively, the UI 28 of the TWS(R) accepts a cancellation operation performed by the user 3 (FIG. 4). In the group control on/off switching information storage unit 27 of the TWS(R), information indicating that group control is invalid is stored as the group control information. Thus, in subsequent operation, the TWS(R) ignores the setting of grouping by the smartphone A.

Next, the smartphone B establishes CIS connection (e.g., CIS_ID: 0x03) to the TWS(R), and the smartphone B transmits a control command to the TWS(R), which makes it possible for the smartphone B to control the volume setting of the TWS(R). Thereafter, even if a control command is further transmitted from the smartphone A to the TWS(L) and the TWS(R), the TWS(R) does not make a volume change based on the command, because the control command is a command transmitted from the Access Address of the smartphone A serving as the Lock acquisition request source. Thus, even in a state in which a Lock has been obtained by the smartphone A, the smartphone B is able to control the volume of the TWS(R) singly, without undergoing unintended control by the smartphone A.

FIG. 5 illustrates an example of a process that is performed when a control command for Lock acquisition (a Lock control command) is received in each of the multiple communication devices 2L and 2R (the TWS(L) and the TWS(R)) of the communication system according to the first embodiment.

In each of the multiple communication devices 2L and 2R, first, the Lock command processing unit 25 receives, as a data reception process, received data including device information and a Lock control command, via the data reception unit 21 and the received data decoding unit 22 (step S11).

Next, the Lock command processing unit 25 determines whether or not there are Lock resources in the own device (step S12). In a case where the Lock command processing unit 25 determines that there are no Lock resources (step S12; N), the Lock command processing unit 25 ends the process of receiving the Lock control command.

In contrast, in a case where the Lock command processing unit 25 determines that there are Lock resources (step S12; Y), the Lock command processing unit 25 acquires the device information regarding the external device as the Lock acquisition request source, as the Locked Access Address, from the received data (step S13).

Next, the Lock command processing unit 25 updates the Lock information (Lock Status, Locked Access and Address) to be stored in the Lock information storage unit 26 (step S14), and ends the process of receiving the Lock control command.

FIG. 6 illustrates an example of a process that is performed when, for example, a control command such as a setting change (e.g., a volume setting change) is received in each of the multiple communication devices 2L and 2R (the TWS(L) and the TWS(R)) of the communication system according to the first embodiment.

In each of the multiple communication devices 2L and 2R, first, the control command processing unit 23 receives, as a data reception process, received data including device information and a control command, via the data reception unit 21 and the received data decoding unit 22 (step S21).

Next, the control command processing unit 23 acquires the device information regarding the reception source from the received data (step S22).

Next, the control command processing unit 23 checks the Lock information stored in the Lock information storage unit 26, and the group control information stored in the group control on/off switching information storage unit 27 (step S23). In a case where the condition (A) or (C) holds in step S23, the control command processing unit 23 executes the control command (step S24), and ends the process of receiving the control command. In a case where the condition (B) holds in step S23, the control command processing unit 23 ends the process of receiving the control command, without executing the control command.

FIG. 7 illustrates an example of branch conditions in step S23 in the flowchart illustrated in FIG. 6.

The condition (A) is a case where, for example, the Lock information and the group control information are as follows.

Device information of received data=device information of Lock information

Lock Status=Lock

Group control information=valid (cancellation command absent)

The condition (B) is a case where, for example, the Lock information and the group control information are as follows.

Device information of received data=device information of Lock information

Lock Status=Lock

Group control information=invalid (cancellation command present)

The condition (C) is a case where, for example, the Lock information and the group control information are as follows.

Device information of received data device information of
Lock information
  Lock Status=Lock
  Group control information=invalid (cancellation com-
    mand present)

[1.3 Effects]

As described above, in the communication system accord-
ing to the first embodiment, whether or not to execute the
control command included in the data received after the
control right for grouping is obtained is determined, on the
basis of presence or absence of a cancellation command that
cancels grouping, and the device information stored in the
Lock information storage unit 26. This makes it possible to
avoid unintended control on the multiple communication
devices 2L and 2R.

It is to be noted that the effects described in the present
specification are merely examples and not limitative, and
other effects may be achieved. The same applies to effects of
the following other embodiments.

[1.4 Modification Example]

Although a case where the multiple external devices 1A
and 1B are mobile terminals such as the smartphones A and
B is described as an example in the first embodiment
described above, the technology according to the present
disclosure is not limited to the case where the multiple
external devices 1A and 1B are mobile terminals. In addi-
tion, although a case where the multiple communication
devices 2L and 2R are TWS devices is described as an
example, the technology according to the present disclosure
is not limited to the case where the multiple communication
devices 2L and 2R are TWS devices. In addition, a com-
munication system according to the present disclosure may
include three or more communication devices. In addition, a
communication system according to the present disclosure
may be configured to be controlled by three or more external
devices.

FIG. 8 illustrates an example of operation of a commu-
nication system according to a modification example of the
first embodiment.

The communication system according to the modification
example includes three communication devices 4L, 4R, and
4C. The three communication devices 4L, 4R, and 4C are
each able to be controlled by three external devices 1A, 1B,
and 1C. The three communication devices 4L, 4R, and 4C
may each have a configuration substantially similar to the
configuration illustrated in FIG. 2.

The three external devices 1A, 1B, and 1C may each be,
for example, a mobile terminal such as a smartphone. FIG.
8 illustrates an example in which the external device 1A is
a smartphone A, the external device 1B is a smartphone B,
and the external device 1C is a smartphone C. The three
communication devices 4L, 4R, and 4C may be, for
example, audio devices such as surrounding speakers. FIG.
8 illustrates an example in which the communication device
4L is, for example, a left speaker (denoted by a speaker (L))
of surrounding speakers, the communication device 4R is,
for example, a right speaker (denoted by a speaker (R)) of
the surrounding speakers, and the communication device 4C
is, for example, a center speaker (denoted by a speaker (C))
of the surrounding speakers.

For example, in the example of FIG. 8, the three com-
munication devices 4L, 4R, and 4C (the speaker (L), the
speaker (R), and the speaker (C)) are able to be controlled
in a state of being grouped with each other, by any one of the
three external devices 1A, 1B, and 1C (the smartphones A,
B, and C). In addition, the three communication devices 4L,
4R, and 4C (the speaker (L), the speaker (R), and the speaker (C)) are able to be controlled in a state of being independent
of each other, by at least one of the three external devices
1A, 1B, and 1C (the smartphones A, B, and C).

FIG. 8 illustrates an example in which the external device
1A (the smartphone A) out of the three external devices 1A,
1B, and 1C obtains a Lock as the first external device, the
external device 1B (the smartphone B) controls the com-
munication device 4R (the speaker (R)) singly as the second
external device, and the external device 1C (the smartphone
C) controls the communication device 4C (the speaker (C))
singly as the second external device. In addition, FIG. 8
illustrates an example in which the UI 28 of the speaker (R)
and the speaker (C) accepts a cancellation operation per-
formed by the user 3.

For example, in a state in which BLE connection is
established between the smartphone A and the speaker (L),
between the smartphone A and the speaker (R), and between
the smartphone C and the speaker (C), a Write Request for
Lock acquisition is transmitted from the smartphone A to the
speaker (L), the speaker (R), and the speaker (C), and the
smartphone A acquires a Lock (obtains a control right).
Thus, the speaker (L), the speaker (R), and the speaker (C)
are grouped, making it possible for the smartphone A to
control the speaker (L), the speaker (R), and the speaker (C)
at the same time. At this time, the speaker (L), the speaker
(R), and the speaker (C) each store the device information
regarding the smartphone A serving as the Lock acquisition
request source, as the Locked Access Address, in the Lock
information storage unit 26.

Next, the smartphone A establishes CIS connection to
each of the speaker (L), the speaker (R), and the speaker (C).
At this time, CIS_IDs are set (e.g., CIS_ID: 0x01, CIS_ID:
0x02, CIS_ID: 0x03).

Next, the smartphone A transmits a control command that
changes, for example, volume setting to the speaker (L), the
speaker (R), and the speaker (C). Thus, the speaker (L), the
speaker (R), and the speaker (C) are subjected to volume
setting control by the smartphone A as a group. The control
command is transmitted on the basis of the GATT protocol.

After grouping is performed by the smartphone A, the UI
28 of each of the speaker (R) and the speaker (C) accepts a
cancellation operation performed by the user 3. In the group
control on/off switching information storage unit 27 of each
of the speaker (R) and the speaker (C), information indicat-
ing that group control is invalid is stored as the group control
information. Thus, in subsequent operation, the speaker (R)
and the speaker (C) ignore the setting of grouping by the
smartphone A.

Next, the smartphone B establishes CIS connection (e.g.,
CIS_ID: 0x04) to the speaker (R), and the smartphone B
transmits a control command to the speaker (R), which
makes it possible for the smartphone B to control the volume
setting of the speaker (R).

Thereafter, even if a control command is further trans-
mitted from the smartphone A to each of the speaker (L), the
speaker (R), and the speaker (C), the speaker (R) and the
speaker (C) do not make a volume change based on the
command, because the control command is a command
transmitted from the Access Address of the smartphone A
serving as the Lock acquisition request source. Thus, even in
a state in which a Lock has been obtained by the smartphone
A, the smartphone B is able to control the volume of the
speaker (R) singly, without undergoing unintended control
by the smartphone A.

Similarly, the smartphone C establishes CIS connection
(e.g., CIS_ID: 0x05) to the speaker (C), and the smartphone
C transmits a control command to the speaker (C), which makes it possible for the smartphone C to control the volume setting of the speaker (C). Even in a state in which a Lock has been obtained by the smartphone A, the smartphone C is able to control the volume of the speaker (C) singly, without undergoing unintended control by the smartphone A.

2. Other Embodiments

The technology according to the present disclosure is not limited to the description of the first embodiment described above, and various modifications may be made.

For example, the present technology may have the following configurations.

According to the present technology having the following configurations, whether or not to execute the control command included in the data received after the control right for grouping is obtained is determined, on the basis of presence or absence of a cancellation command that cancels grouping, and the device information stored in the storage unit. This makes it possible to avoid unintended control on the multiple communication devices.

(1)

A communication system including multiple communication devices that are able to be controlled in a state of being grouped with each other, by any first external device out of multiple external devices, and are able to be controlled in a state of being independent of each other, by any at least one second external device out of the multiple external devices, in which the multiple communication devices each include a reception unit configured to receive data including a control command and device information from the multiple external devices, a storage unit that stores the device information regarding the first external device that has obtained a control right for the grouping, and a control unit that determines whether or not to execute the control command included in the data received by the reception unit after the control right for the grouping is obtained by the first external device, on the basis of presence or absence of a cancellation command that cancels the grouping, and the device information stored in the storage unit.

(2)

The communication system according to (1), in which the control unit determines whether or not the data received by the reception unit is data transmitted from the first external device, on the basis of the device information stored in the storage unit and the device information included in the data received by the reception unit.

(3)

The communication system according to (2), in which the control unit does not execute the control command included in the data received by the reception unit, in a case where the control unit determines that the cancellation command is present, and that the data received by the reception unit is data transmitted from the first external device.

(4)

The communication system according to (2) or (3), in which the control unit executes the control command included in the data received by the reception unit, in a case where the control unit determines that the cancellation command is present, and that the data received by the reception unit is not data transmitted from the first external device.

(5)

The communication system according to any one of (2) to (4), in which the control unit executes the control command included in the data received by the reception unit, in a case where the control unit determines that the cancellation command is absent, and that the data received by the reception unit is data transmitted from the first external device.

(6)

The communication system according to any one of (1) to (5), in which the cancellation command is transmitted from the second external device.

(7)

The communication system according to any one of (1) to (6), in which the multiple communication devices each further include an operation unit that accepts input of the cancellation command.

(8)

A communication control method, in a communication system including multiple communication devices that are able to be controlled in a state of being grouped with each other, by any first external device out of multiple external devices, and are able to be controlled in a state of being independent of each other, by any at least one second external device out of the multiple external devices, the communication control method including, by each of the multiple communication devices:

receiving data including a control command and device information from the multiple external devices;

storing, in a storage unit, the device information regarding the first external device that has obtained a control right for the grouping; and determining whether or not to execute the control command included in the data received after the control right for the grouping is obtained by the first external device, on the basis of presence or absence of a cancellation command that cancels the grouping, and the device information stored in the storage unit.

This application claims the benefit of Japanese Priority Patent Application JP2020-185337 filed with the Japan Patent Office on Nov. 5, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication system, comprising:

a plurality of communication devices, wherein the plurality of communication devices is controlled, by a first external device of a plurality of external devices, in a grouped state, the grouped state is a state where the plurality of communication devices is grouped, the plurality of communication devices is controlled, by at least one second external device of the plurality of external devices, in an independent state, and the independent state is a state where each communication device of the plurality of communication devices is independent of remaining communication devices of the plurality of communication devices, and the each communication device of the plurality of communication devices includes:

a reception unit configured to receive data including a control command and device information from the plurality of external devices, a storage unit configured to store the device information regarding the first external device, and a control unit configured to:

determine presence or absence of a cancellation command, wherein the cancellation command corresponds to cancellation of the grouped state; and control execution of the control command based on the presence or the absence of the cancellation command and the stored device information, wherein the stored device information corresponds to information regarding the first external device that has obtained a control right for the grouped state, and the control command is included in the data received by the reception unit after the control right for the grouped state is obtained by the first external device.

2. The communication system according to claim 1, wherein the control unit is further configured to determine that the data received by the reception unit is data transmitted from the first external device, and the data is transmitted based on the device information stored in the storage unit and the device information included in the data received by the reception unit.

3. The communication system according to claim 2, wherein the control unit is further configured to control non-execution of the control command included in the data received by the reception unit, in a case where the control unit determines that the cancellation command is present, and that the data received by the reception unit is the data transmitted from the first external device.

4. The communication system according to claim 2, wherein the control unit is further configured to control execution of the control command included in the data received by the reception unit, in a case where the control unit determines that the cancellation command is present, and that the data received by the reception unit is different from the data transmitted from the first external device.

5. The communication system according to claim 2, wherein the control unit is further configured to control execution of the control command included in the data received by the reception unit, in a case where the control unit determines that the cancellation command is absent, and that the data received by the reception unit is the data transmitted from the first external device.

6. The communication system according to claim 1, wherein the cancellation command is transmitted from the at least one second external device.

7. The communication system according to claim 1, wherein the each communication device of the plurality of communication devices further includes an operation unit configured to accept input of the cancellation command.

8. A communication control method, comprising:

in a communication system including a plurality of communication devices, wherein the plurality of communication devices is controlled, by a first external device of a plurality of external devices, in a grouped state, the grouped state is a state where the plurality of communication devices is grouped, the plurality of communication devices is controlled, by at least one second external device of the plurality of external devices, in an independent state the independent state is a state where each communication device of the plurality of communication devices is independent of remaining communication devices of the plurality of communication devices, receiving data including a control command and device information from the plurality of external devices;

storing, in a storage unit, the device information regarding the first external device;

determining presence or absence of a cancellation command, wherein the cancellation command corresponds to cancellation of the grouped state; and controlling execution of the control command based on the presence or the absence of the cancellation command and the stored device information, wherein the stored device information corresponds to information regarding the first external device that has obtained a control right for the grouped state, and the control command is included in the data received after the control right for the grouped state is obtained by the first external device.

* * * * *